Patented June 29, 1926.

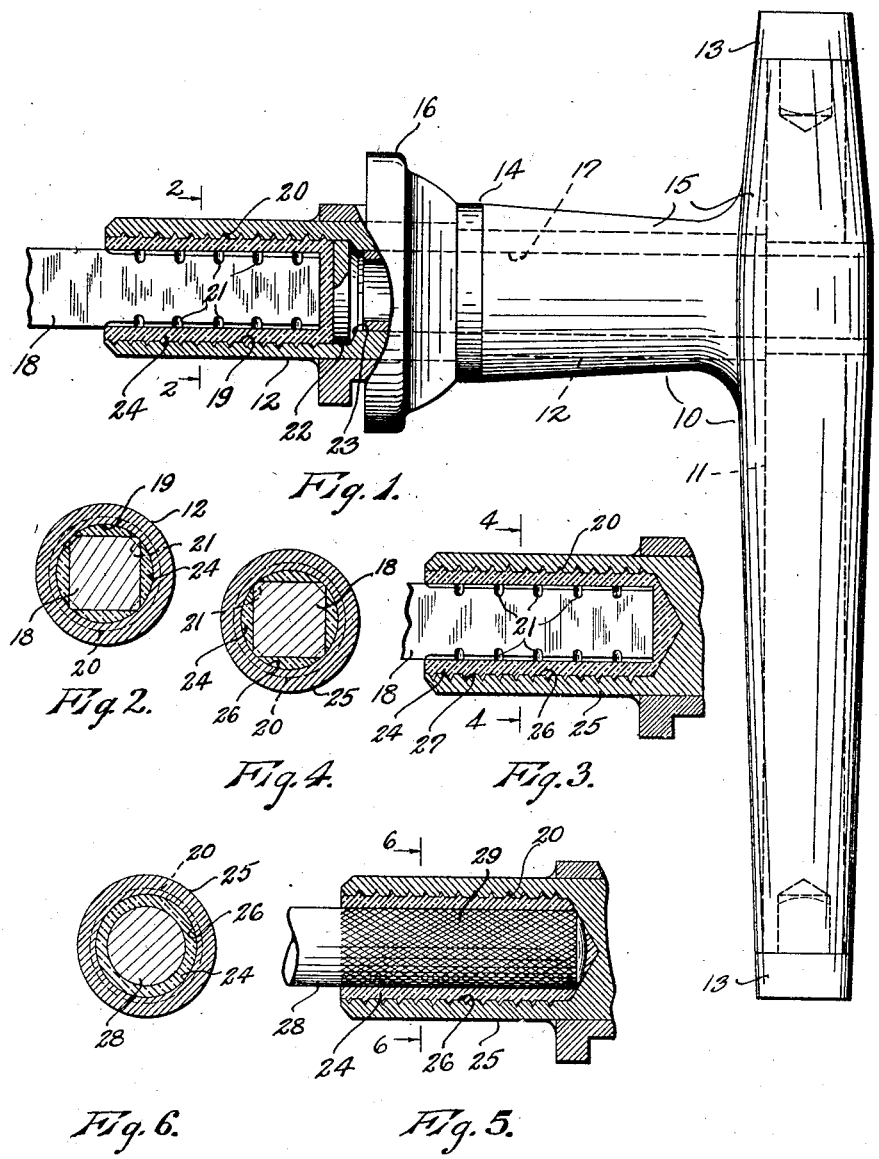

1,590,680

UNITED STATES PATENT OFFICE.

LOUIS W. GATES, OF NEW HAVEN, CONNECTICUT, ASSIGNOR TO C. COWLES & COMPANY, OF NEW HAVEN, CONNECTICUT, A CORPORATION OF CONNECTICUT.

MEANS FOR CONNECTING LATCH HANDLES AND SHANKS.

Application filed December 4, 1923. Serial No. 678,386.

This invention relates to a method and means for securing two elements together. In its broad aspects it is of general application although I have shown and described it as applied for the purpose of securing a latch operating spindle in the shank of a handle.

It is an object of the invention to provide an improved method and means of securing two elements together which will be very simple, in which the required operations are few in number and easily and quickly performed, and which will securely fasten the two elements together.

With the foregoing and other objects in view, I have devised the method and means of securing two articles together which is illustrated in the accompanying drawing, forming a part of this specification, similar reference characters being employed throughout the various figures to indicate corresponding elements. In this drawing, Fig. 1 is a side elevation of a door handle and a connection between the shank of this handle and a latch operating spindle made according to my invention shown in section.

Fig. 2 is a transverse section thereof substantially on line 2—2 of Fig. 1.

Fig. 3 is a view similar to the sectional portion of Fig. 1 showing a slightly different construction of shank.

Fig. 4 is a transverse section thereof substantially on line 4—4 of Fig. 3.

Fig. 5 is a view similar to Fig. 3 showing the invention as used with a cylindrical inner element, and Fig. 6 is a tranverse section thereof substantially on line 6—6 of Fig. 5.

Referring to Figs. 1 and 2 in which I have shown the invention as applied for the purpose of securing a latch operating spindle to the shank of a door handle, 10 represents any desired type of door operating handle. The handle shown is a type of door handle now generally employed for automobile doors and comprises a bar of metal 11 secured to a metal shank 12. Secured to the opposite ends of the bar are finishing ferrules 13, and mounted on the shank at a distance from the bar is a collar 14. In order to give a desired finish the bar and the shank are covered with a rubber composition 15 which is then vulcanized giving a hard strong covering for the bar and the shank. Surrounding the shank and engaging the collar 14 is an escutcheon plate 16 which is secured to the surface of a door in the usual manner by suitable screws, not shown. In the showing in Fig. 1 the shank is a tubular element having an opening 17 extending longitudinally therethrough, but my invention is equally applicable for the purpose of securing a spindle to a solid shank. The latch operating spindle is shown at 18 and is the usual square spindle. Various means have been devised for securing this spindle to the shank of the handle, but they are expensive and it is difficult to secure a simple and cheap connection which will not work loose under extended operation. It is also difficult when making the connection to get the shank and spindle in correct alignment.

I have devised a method and means for securing these elements together in which the operations required are few in number, are very simple and easily performed, in which the elements may be easily aligned and which when completed will securely hold the elements together so that they will not work loose. Extending from the inner end of the shank is an opening 19 forming a socket into which the end of the spindle is inserted. The opening is cylindrical and the usual latch spindle is square so that if the spindle is of such a size that the corners engage the inner surface of the socket there are spaces left between the flat sides of the spindle and the walls of the socket. In making the joint I cut or roughen the inner surface of the side walls of the socket to make this surface uneven. A convenient method of doing this is to insert a tap into the socket which is somewhat smaller than that which would be used to cut a complete thread, and with this tap to cut in the surface of the socket a shallow spiral groove 20. The outer surface of the shank is also made uneven as by knurling or any other desired method, but a convenient and satisfactory easy way of doing this is to press small grooves or notches 21 in the edges of the spindle. The space between the shank and spindle is filled with rubber in a plastic condition and the rubber then vulcanized by heating. The vulcanizing operation as is well-known makes the rubber very hard, and it makes a very tight and strong connection between the spindle and the shank. In fact, it has been found by actual test that the spindle will twist off before the joint between the spindle and the shank will yield.

As a convenient method of filling the space between the shank and the spindle with the plastic rubber I close the inner end of the socket opening with a suitable plug 22, in the present instance in the form of a disc, there being provided a shoulder 23 to limit the inward movement of this plug. Then before inserting the spindle in the socket I place in the socket a block or piece of the plastic rubber of a size sufficient to fill all the spaces required to be filled. I then insert the roughened end of the spindle and force it against this block of plastic rubber with sufficient pressure to force this rubber throughout the space between the spindle and shank and into the depressions in the surfaces of the shank and spindle, such as the groove 20 and the notches 21. The rubber is then vulcanized by heating, giving a very strong connection. It will be apparent that while the rubber is plastic the spindle may be easily aligned with the shank. In case this connection is employed with the type of handle illustrated, the rubber, indicated at 24, of the joint may be vulcanized at the same time the rubber covering 15 of the handle is vulcanized.

In Figs. 3 and 4 I have shown this joint as employed with a solid shank. The shank is indicated at 25 and is bored from its end to form a socket 26 closed at its inner end. The surface of this socket is then scored as described in connection with Fig. 1, as for example, with a tap cutting a shallow spiral groove 27. The block of plastic rubber is placed in the socket, the roughened end of the spindle 18 inserted under pressure as in the first form to distribute the plastic rubber 24 throughout the space and interstices between the shank and spindle, and the rubber is then vulcanized to make it hard to complete the connection.

In Figs. 5 and 6 I have shown how this method may be employed where the inner element is cylindrical. In this case the shank 25 is the same as that shown in Fig. 3 and the socket 26 is prepared in the same way. As the element 28 secured thereto is cylindrical the diameter of the socket is made sufficiently large to leave a space around the inner element. The surface of the element is roughened or made uneven by cutting grooves or knurling it, as indicated at 29. The block of plastic rubber is placed in the socket, then this roughened end is forced into the socket distributing the plastic rubber 24 throughout the space between the two elements and into the recesses caused by the uneven surfaces and the rubber is then vulcanized to make it hard and rigid. It will be evident that the uneven surfaces form a tight grip between the hard rubber and the surfaces of the two elements to be connected, and as this hard vulcanized rubber is very strong when the correct composition is used and the vulcanizing operation is properly performed it will be evident it will make a very strong connection between the two elements.

Although I have shown and described this method as applied for forming the connection between the shank of a door handle and a latch operating spindle, it is evident that it is of general application and is equally applicable for securing other elements.

Having thus set forth the nature of my invention, what I claim is:

In a door handle, a shank having a longitudinal opening leading from one end thereof, the surface of the interior walls of said opening having recesses therein, a spindle extending into said opening and having recesses in the exterior surface thereof, and an integral mass of hard vulcanized rubber between said surfaces and filling said recesses to secure the spindle to the shank.

In testimony whereof I affix my signature.

LOUIS W. GATES.